(12) United States Patent
Gritter et al.

(10) Patent No.: US 8,108,840 B2
(45) Date of Patent: Jan. 31, 2012

(54) METHOD FOR ENHANCING DEBUGGER PERFORMANCE OF HARDWARE ASSISTED BREAKPOINTS

(75) Inventors: Daniel S. Gritter, Wappingers Falls, NY (US); Gerald B. Strait, Salt Point, NY (US); Mei-Hui Wang, Brookfield, CT (US); Joshua B. Wisniewski, Elizaville, NY (US)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 11/330,452

(22) Filed: Jan. 12, 2006

(65) Prior Publication Data

US 2007/0174703 A1 Jul. 26, 2007

(51) Int. Cl.
*G06F 9/44* (2006.01)
*G06F 11/00* (2006.01)

(52) U.S. Cl. ............. 717/129; 712/227; 714/34; 714/35

(58) Field of Classification Search .................... 717/129
See application file for complete search history.

(56) References Cited

U.S. PATENT DOCUMENTS

| | | | | |
|---|---|---|---|---|
| 5,491,793 A * | 2/1996 | Somasundaram et al. | ...... | 714/45 |
| 5,621,886 A * | 4/1997 | Alpert et al. | ...... | 714/38 |
| 5,664,159 A * | 9/1997 | Richter et al. | ...... | 703/23 |
| 6,026,235 A * | 2/2000 | Shaughnessy | ...... | 717/127 |
| 6,052,801 A * | 4/2000 | Hammond et al. | ...... | 714/38.13 |
| 6,126,329 A * | 10/2000 | Bennett et al. | ...... | 717/127 |
| 6,708,326 B1 * | 3/2004 | Bhattacarya | ...... | 717/124 |
| 2004/0040013 A1 | 2/2004 | Kalra | ...... | 717/129 |
| 2004/0083458 A1 | 4/2004 | Gschwind et al. | ...... | 717/129 |
| 2006/0069959 A1 * | 3/2006 | Schultz | ...... | 714/35 |
| 2006/0070039 A1 * | 3/2006 | Bates et al. | ...... | 717/129 |
| 2006/0294433 A1 * | 12/2006 | Thelen | ...... | 714/38 |

FOREIGN PATENT DOCUMENTS

EP 0720 092 A1 3/1996

OTHER PUBLICATIONS

Corliss, M.L.; Lewis, E.C.; Roth, A., "Low-overhead interactive debugging via dynamic instrumentation with DISE," High-Performance Computer Architecture, 2005. HPCA-11. 11th International Symposium on , vol., No., pp. 303-314, Feb. 12-16, 2005.*
Jonathan B. Rosenberg, "How Debuggers Work", 1996, Wiley Computer Publishing, ISBN 0-471-14966-7, Chapter 3.*

* cited by examiner

*Primary Examiner* — James D Rutten
(74) *Attorney, Agent, or Firm* — Cantor Colburn LLP; Steven Chiu

(57) ABSTRACT

A method for enhancing debugger performance of hardware assisted breakpoints across multiple units includes deferring all active location breakpoints within the multiple modules, and subsequently activating each valid location breakpoint in a present one of the multiple modules being entered.

11 Claims, 5 Drawing Sheets

| LOCATION | ADDRESS RANGE BEGIN | ADDRESS RANGE END | TOTAL BYTES MONITORED |
|---|---|---|---|
| 1 (without) | 5,500 | 5,600 | 100 |
| (with) | 5,500 | 5,600 | 100 |
| 2 (without) | 1,500 | 5,600 | 4,100 |
| (with) | 1,500 | 1,700 | 200 |
| 3 (without) | 1,500 | 5,600 | 4,100 |
| (with) | 5,500 | 5,600 | 100 |
| 4 (without) | 1,500 | 5,600 | 4,100 |
| (with) | 1,500 | 1,700 | 200 |
| 5 (without) | 1,500 | 5,600 | 4,100 |
| (with) | 1,500 | 1,700 | 200 |
| 6 (without) | 1,500 | 80,600 | 79,100 |
| (with) | 80,500 | 80,600 | 100 |
| 7 (without) | 1,500 | 80,600 | 79,100 |
| (with) | 1,500 | 1,700 | 200 |
| 8 (without) | 1,500 | 80,600 | 79,100 |
| (with) | 5,500 | 5,600 | 100 |

METHOD FOR ENHANCING DEBUGGER PERFORMANCE OF HARDWARE ASSISTED BREAKPOINTS

BACKGROUND

The present invention relates generally to code debugging in computer systems and, more particularly, to a method for enhancing debugger performance of hardware assisted breakpoints.

During development of application programs, developers use a debug program (debugger) to control the flow of application program execution and to inspect aspects of programs. The debugger allows developers to set breakpoints at specific locations in an application module so that the programmer can step into the code line-by-line, or resume execution of the program as required. Breakpoints corresponding to an address (termed "location breakpoints") are resolved with assist from a hardware event facility. When an instruction is fetched from an address range being monitored by a hardware event facility, the facility will notify the debugger and the debugger will stop an application and display the location. Debugger location breakpoints that represent respective addresses are used to create the hardware event facility address range. Debuggers may also use breakpoints that are not hardware assisted.

In order to monitor multiple addresses, the hardware event facility maintains a single address range. That is, if a first location breakpoint is set for address 1000 in the system memory and a second location breakpoint is set for address 2000, then a range is set with a begin address of 1000 and an end address of 2000. Thus, all addresses between (and including) 1000 and 2000 are monitored. Where the begin and end addresses defining a range are far apart from one another, then the hardware event facility is forced to monitor a large address range, which takes more time than monitoring a small address range. As a result, a debugger with active location breakpoints representing a large address range becomes noticeably less efficient. Value would be therefore be added to a debugger if the maximum address range monitored by a hardware event facility could be kept to a minimum.

Whenever a debugger user requests to set a breakpoint, it must be validated before it can be accepted by the debugger. The validation process typically ensures that the information provided by the user represents a real program address. If the location breakpoint can be validated then it is set as active, thus affecting the hardware event facility address range. On the other hand, if the breakpoint cannot be validated, the debugger will not allow it to be set.

In addition, debuggers may also provide an option in which a deferred breakpoint may be created; that is, a "deferred" breakpoint is one that is validated at a later time. As such, deferred location breakpoints do not affect the hardware event facility address range prior to validation thereof. Conventionally, deferred breakpoints are validated as additional application modules are entered. If a deferred location breakpoint can be validated at such a time, then its state is changed from "deferred" to "active" and it will result in redefining the hardware event facility address range if it falls outside the existing range. If it cannot be validated, the breakpoint remains in a deferred state.

Unfortunately, as an application debugged in a conventional manner enters into additional modules, the potential exists for the address range to grow very large as more location breakpoints become active. This has the effect of making the hardware event facility less efficient and will slow the performance of the debugger. Accordingly, it would be desirable to be able to enhance debugger performance of hardware assisted location breakpoints across multiple modules.

SUMMARY

The above discussed drawbacks and deficiencies of the prior art are overcome or alleviated by a method for enhancing debugger performance of hardware assisted breakpoints across multiple program units. In an exemplary embodiment, the method includes deferring all active location breakpoints within the multiple program units, and subsequently activating each valid location breakpoint in a present one of the multiple program units being entered.

In another embodiment, a storage medium includes a machine readable computer program code for enhancing debugger performance of hardware assisted breakpoints across multiple program units, and instructions for causing a computer to implement a method. The method further includes deferring all active location breakpoints within the multiple program units, and subsequently activating each valid location breakpoint in a present one of the multiple program units being entered.

In still another embodiment, a computer architecture includes a hardware event facility for monitoring a debugging process of application programming units stored in memory, and a linkage code for executing calls and returns between the application programming units, the linkage code further including a debugger hook handler therein. The debugger hook handler is configured for, upon activation thereof, deferring all active location breakpoints within the application programming units and subsequently activating each valid location breakpoint in a present one of the application programming units being entered.

BRIEF DESCRIPTION OF THE DRAWINGS

Referring to the exemplary drawings wherein like elements are numbered alike in the several Figures.

DETAILED DESCRIPTION

Disclosed herein is a method for enhancing debugger performance of hardware assisted breakpoints across multiple program units, such as modules. Briefly stated, the state of debugger location breakpoints in a debug session are controlled in a manner such that only the breakpoints for an application module which is currently executing are in an active state, while all others are deferred until such time as their respective units (modules) are entered/re-entered. By limiting the maximum possible address range to a single program unit, the effective address range of a hardware event facility is minimized, thereby improving the performance of a debugger.

As used herein, a "program unit" generally refers to a unit of application code with defined entry and exit code to which a debugger hook can be added. Examples of this include functions and modules in the C programming language. That is, all functions in a C program include function linkage code which executes when the function is entered and exited. Similarly, a call to or return to a function in a different program module will execute module linkage code to which a debugger hook can be added.

In an exemplary embodiment, the methodology described herein may be implemented through hooks in module linkage code, but can also be applied to similar linkage code such as function linkage. It should therefore be understood that present methodology is not necessarily limited to the scope of module linkage. The method can be applied to any program unit which includes entry and exit code to which a call hook handler can be included. For example, the common concept of a function includes entry and exit linkage code.

Figure 1:
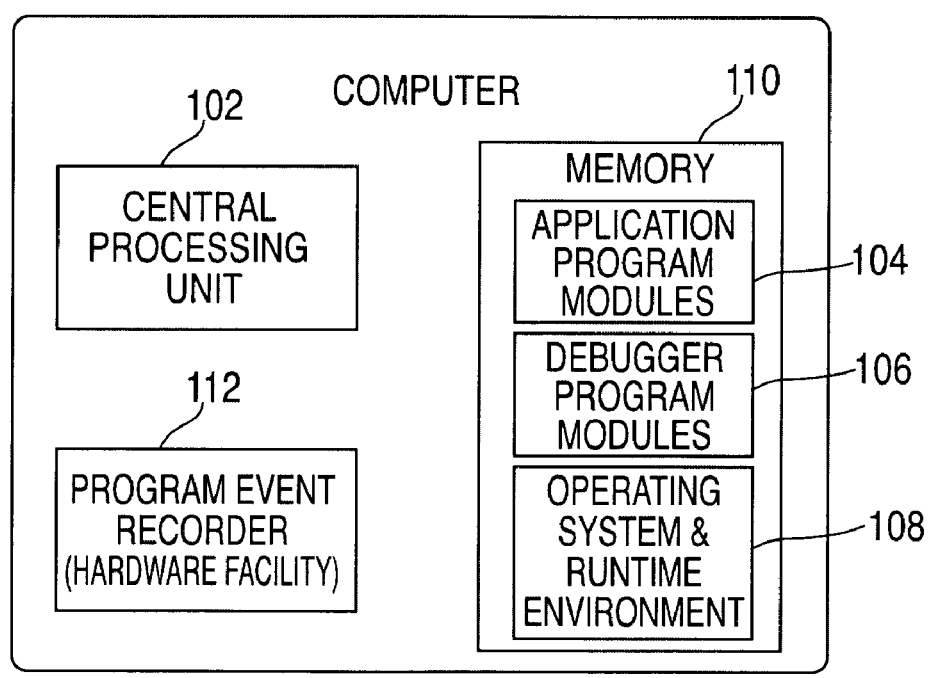
FIG. 1 illustrates a general-purpose computing environment suitable for use in accordance with an embodiment of the invention.

Referring initially to FIG. 1, there is shown a general-purpose computing environment 100, suitable for use in accordance with an embodiment of the invention. From a program developer's point of view, this is also referred to as the computer architecture. As is shown, the computer architecture 100 includes a central processing unit (CPU) 102, as well as operating system code 104, supporting environment code 106 and application code 108 (the code residing in memory 110 where they may execute). Program developers create application programs by writing source code and compiling source into objects and linking objects into modules and loading those modules to the memory 110 of the computer. As indicated above, the architecture 100 also includes a hardware event facility 112 that assists in the debugging process.

Figure 2:
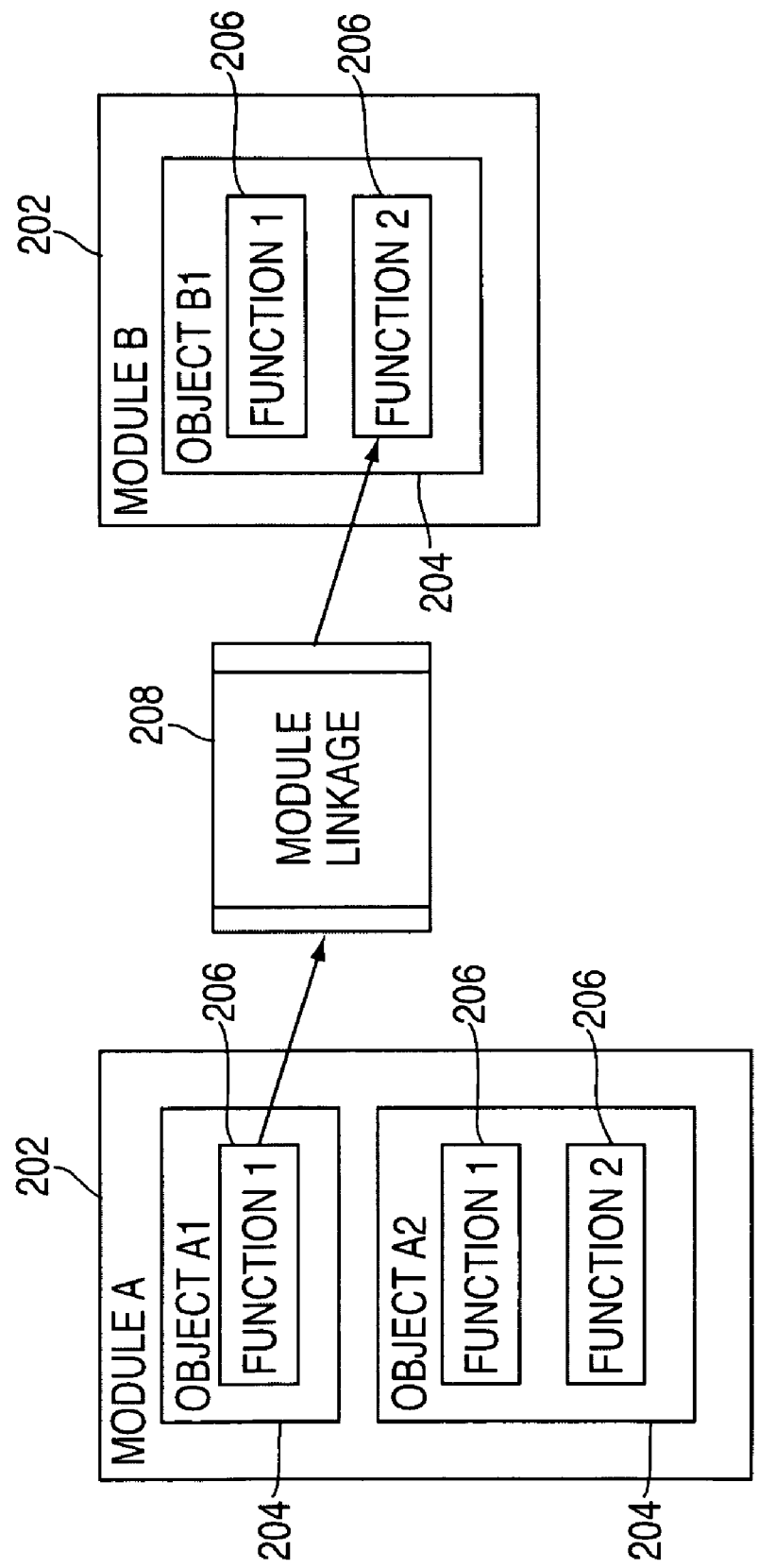
FIG. 2 schematically illustrates an application made up of a number of modules, each containing objects that in turn contain functions, and the module linkage code executed during a call or return between functions in different modules.

FIG. 2 schematically illustrates an application made up of a number of modules 202 (Module A, Module B) each containing objects 204 that in turn contain functions 206. Functions, as is known in the art, are discrete blocks of code which are callable, perform a task and return to their caller. Whenever a function calls to (or returns to) a function in a different module, common environment linkage code 208 will execute as part of the call or return. In conventional debugging techniques, breakpoints that are active in Module A, for example, will remain so even after a call to another function in Module B, which can possibly result in the creation of a larger than necessary address range during the execution of a function in Module B.

Figure 3:
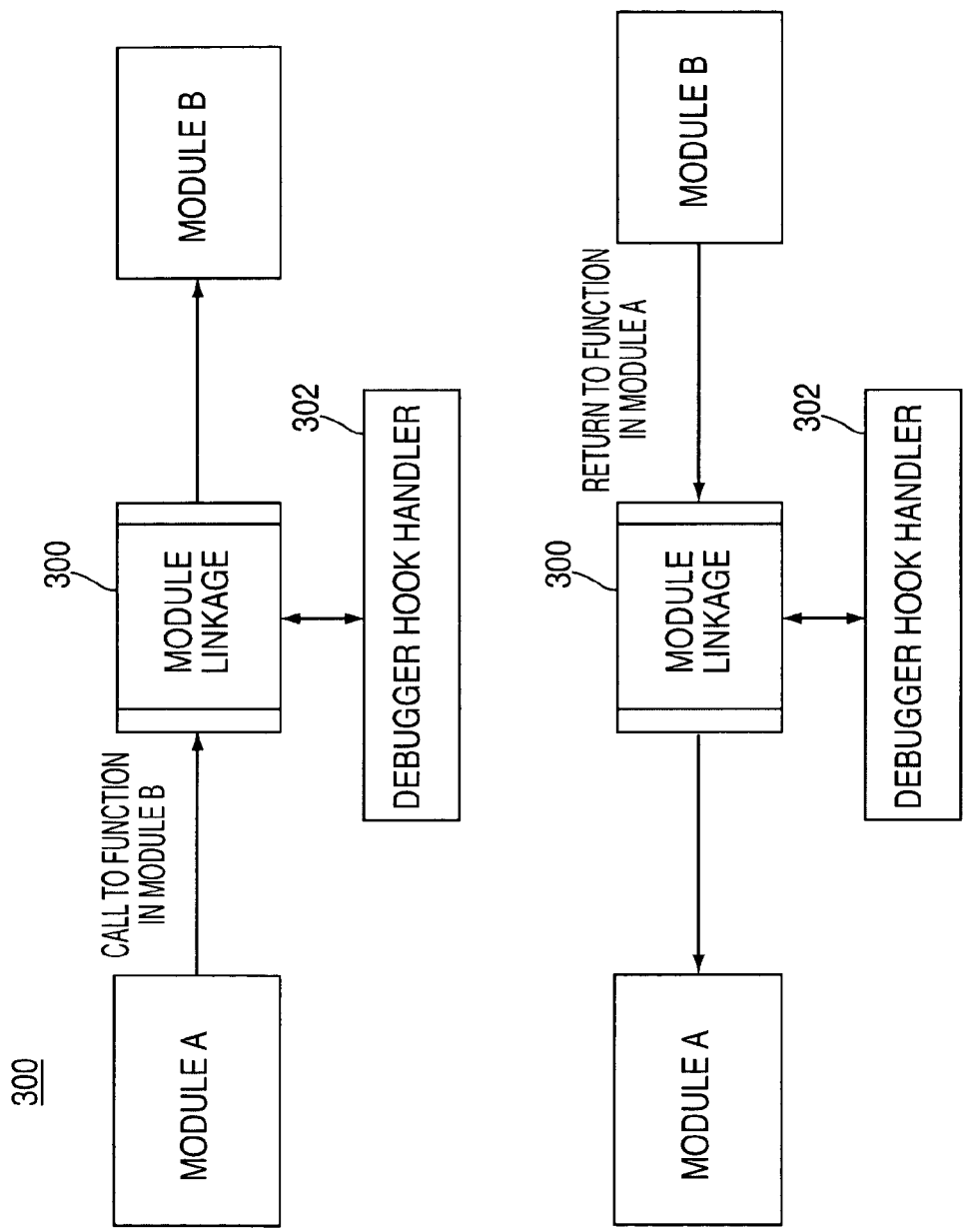
FIG. 3 schematically illustrates module linkage code configured with a debugger hook handler, in accordance with an embodiment of the invention.

Accordingly, FIG. 3 schematically illustrates module linkage code 300 that is configured with a debugger hook handler 302, in accordance with an embodiment of the invention. As is shown, the module linkage code 300 and the debugger hook handler 302 execute when a function calls to or returns to a function in a different module. It will be noted that the debugger hook handler only executes if the application is being debugged. An exemplary methodology 400 implemented by the debugger hook handler 302 (and called from the module linkage code 300) is illustrated in the flow diagram of FIG. 4.

The process 400 begins with the execution of the debugger hook handler upon being called from the module linkage code, as shown at block 402. Again, from FIG. 3, the linkage code 300 and thus debugger hook handler 302 are called either during a function call or a return. Thus, the process flow 400 can depict either situation. In any case, once the debugger hook handler is called, all active location breakpoints in the application are set to a deferred state, as shown at block 404. Then, at decision block 406, it is determined whether there are any location breakpoints included in the module currently being entered. If not, then the process simply returns back to the module linkage code as shown at block 408.

On the other hand, if the module being entered does in fact include location breakpoints therein, then process 400 proceeds to decision block 410 to determine whether a first location breakpoint in the module being entered is valid (e.g., represents a real program address). If so, then the state of the location breakpoint is changed from deferred to active, as shown in block 412; if not, the location breakpoint is not made active. In either instance, the process 400 then reaches decision block 414 to determine whether other location breakpoints are present in the module being entered. If so, the process 400 loops back to decision block 410 and continues until all valid location breakpoints in the module being entered have been changed from deferred to active. Then, the debugger hook handler routine is completed and the process returns back to the module linkage code (block 408). Thus executed, the hook handler process activates deferred location breakpoints in the module being entered prior to module entry.

Figures 5A, 5B:
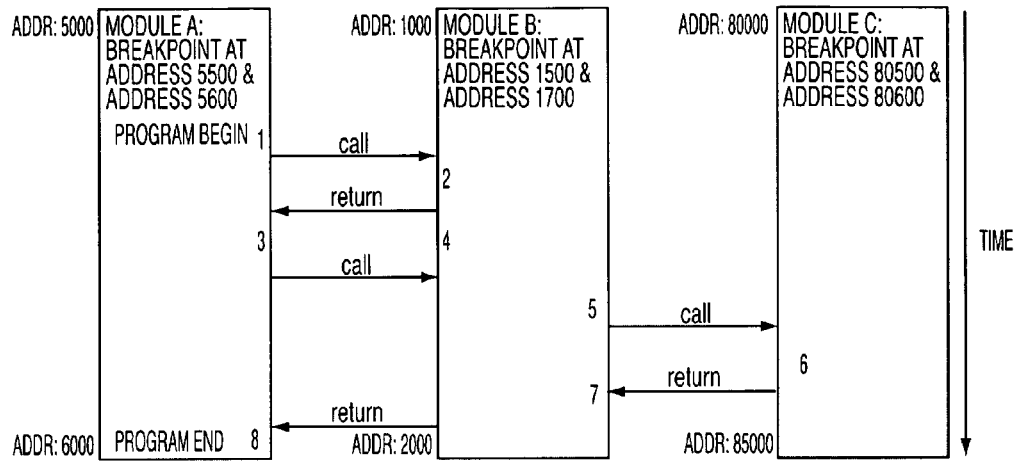
FIG. 5(a) is an application sequence flow diagram for a series of hypothetical call/return operations executed between a plurality of modules having location breakpoints included therein.
FIG. 5(b) is a table illustrating a comparison between the resulting address range at various locations in a debugging sequence with and without the use of the methodology shown in FIG. 4.

Finally, FIGS. 5(*a*) and 5(*b*) demonstrate an exemplary operation of the debugger hook handler for a sequence of call and return operations. In particular, FIG. 5(*a*) is an application sequence flow diagram for a series of hypothetical call/return operations executed between a plurality of modules (A, B, C) having location breakpoints included therein. FIG. 5(*b*) is a table illustrating a comparison between the resulting address range after each location in the sequence with and without the use of the above described hook handler methodology.

As specifically shown in FIG. 5(*a*), a first module (Module A) has a begin address (5000) and an end address (6000) with location breakpoints at addresses 5500 and 5600. A second module (Module B) has a begin address (1000) and an end address (2000) with location breakpoints at addresses 1500 and 1700, and a third module (Module C) has a begin address (80000) and an end address (85000) with location breakpoints at addresses 80500 and 80600. In the hypothetical illustrated, there are eight numbered locations along the flow of a program execution.

Figure 4:
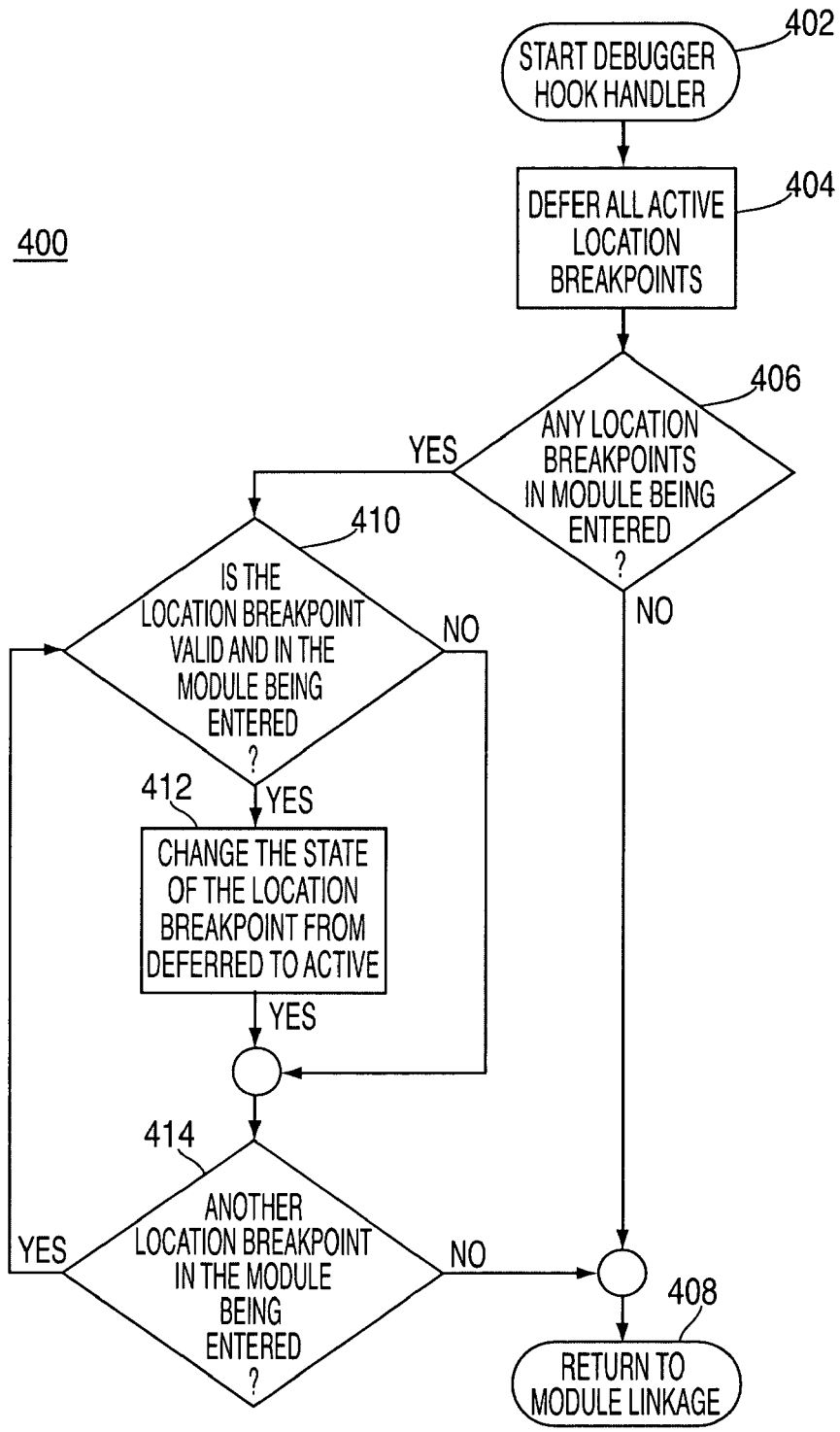
FIG. 4 is a flow diagram illustrating a method for enhancing debugger performance of hardware assisted breakpoints across multiple program units, in accordance with an embodiment of the invention.

FIG. 5(*b*) is a table that illustrates the difference in resulting address ranges between a conventional debugging sequence and the methodology illustrated in FIG. 4. In FIG. 5(*b*), the conventional results are depicted by the designation "without" while the results using the present methodology are depicted by the designation "with." At location 1, the program has just begun and active location breakpoints are set in module A, while deferred location breakpoints are set in module B and C. The remaining numbered locations represent subsequent locations in the flow of a program. Thus, at location 1, only the location breakpoints in module A are active so the address range is from address 5500 to 5600 (i.e., 100 bytes). This is the case regardless of whether or not the present methodology is implemented.

However, at location 2, there is a call from module A to module B. Conventionally, the location breakpoints in module A remain active; thus, upon entering module B the activated location breakpoints therein result in an expanded address range of 4100 total bytes being monitored by the hardware event facility (now from 1500 to 5600). In contrast, since the present methodology deactivates the location breakpoints in module A prior to entering module B, the address range of activated location breakpoints is only 200 bytes in size (from 1500 to 1700). Furthermore, upon return to module A, (location 3) the address range remains at 4100 bytes in a conventional process whereas the address range returns to 100 bytes in the present process (from 5500 to 5600).

The advantages of the present methodology become even more apparent upon observing location 6 of the execution flow, during which there is a call from module B to module C. In this instance, it can now be seen that the address range end jumps up to 80,600. As a result, the conventional debugging process now monitors a total address range of 79,100 bytes. In contrast, the present methodology deactivates the location breakpoints in modules A and B, thus keeping the address range down to 100 bytes (80,500 to 80,600). It will further be appreciated that additional modules having addresses at even higher numbers will create larger address ranges as they are entered during function calls. Accordingly, through the present methodology, the hardware event facility address range can be greatly reduced and the efficiency of the debugger improved.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIG. 4.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for enhancing debugger performance in a computing system, the method comprising:
   initially deferring, through a debugger hook handler included in a linkage code stored in a memory of the computing system in which the linkage code resides and executes, all active location breakpoints within multiple program units of an application code residing in the memory of the computing system in which the multiple program units execute, wherein each of the multiple program units has a defined entry and exit code to which the debugger hook handler may be added; and
   subsequently activating each valid location breakpoint in a present one of the multiple program units being entered, wherein location breakpoints correspond to begin and end addresses within the program units residing in the memory of the computing system in which the multiple program units execute, so as to limit a maximum possible address range to a single program unit, and minimize an effective address range of a hardware event facility.

2. The method of claim 1, wherein said multiple program units further comprise discrete modules.

3. The method of claim 2, wherein said debugger hook handler is activated during both function calls between modules and returns between modules.

4. The method of claim 1, further comprising:
   following said deferring all active location breakpoints, determining whether said present program unit being entered contains any location breakpoints therein;
   immediately returning to said linkage code where no location breakpoints are present; and
   otherwise individually determining whether each location breakpoint is valid and activating the same where valid.

5. An article of manufacture, comprising:
   a non-transitory computer readable storage medium having readable computer program code stored thereon that, when executed by a computer, implement a method for enhancing debugger performance in a computing system, the method comprising:
   deferring all active location breakpoints within multiple program units of an application code residing in a memory of the computing system in which the multiple program units execute, wherein each of the multiple program units has a defined entry and exit code to which a debugger hook handler may be added; and
   subsequently activating each valid location breakpoint in a present one of the multiple program units being entered, wherein location breakpoints correspond to begin and end addresses within the program units residing in the memory of the computing system in which the multiple program units execute, so as to limit a maximum possible address range to a single program unit, and minimize an effective address range of a hardware event facility.

6. The article of claim 5, wherein said debugger hook handler is activated during both function calls between program units and returns between program units.

7. The article of claim 5, wherein said multiple program units further comprise discrete modules.

8. A computer architecture, comprising:
   a computer having a central processing unit, a memory, and program event recorder therein, the program event recorder comprising a hardware event facility for monitoring a debugging process of multiple programming units of an application code stored in the memory in which the multiple program units execute; and
   a linkage code stored in the memory for executing calls and returns between said multiple programming units, said linkage code further including a debugger hook handler therein, wherein each of the multiple program units has a defined entry and exit code to which the debugger hook handler may be added;
   wherein said debugger hook handler is configured for, upon activation thereof:

initially deferring all active location breakpoints within said multiple programming units; and subsequently activating each valid location breakpoint in a present one of said multiple programming units being entered, wherein location breakpoints correspond to begin and end addresses within the program units residing in the memory of the computing system in which the multiple program units execute, so as to limit a maximum possible address range to a single program unit, and minimize an effective address range of a hardware event facility.

9. The architecture of claim 8, wherein said debugger hook handler is activated during both function calls between units and returns between units.

10. The architecture of claim 8, wherein said debugger hook handler is further configured for:

following said deferring all active location breakpoints, determining whether said application programming units in said present unit being entered contains any location breakpoints therein;

immediately returning to said linkage code where no location breakpoints are present; and otherwise individually determining whether each location breakpoint is valid and activating the same where valid.

11. The architecture of claim 8, wherein said programming units comprise individual modules.

* * * * *